United States Patent
Jang et al.

(10) Patent No.: US 10,186,078 B2
(45) Date of Patent: Jan. 22, 2019

(54) SYSTEM AND METHOD OF RECOGNIZING INDOOR LOCATION OF MOVING OBJECT

(71) Applicant: Polariant, Inc., Seoul (KR)

(72) Inventors: Hyouk Jang, Seoul (KR); Hyeon Gi Jeon, Cheongju (KR); Youngjae Choi, Seoul (KR)

(73) Assignee: Polariant, Inc., Seoul (KR)

( * ) Notice: Subject to any disclaimer, the term of this patent is extended or adjusted under 35 U.S.C. 154(b) by 0 days.

(21) Appl. No.: 15/886,945

(22) Filed: Feb. 2, 2018

(65) Prior Publication Data

US 2018/0158237 A1 Jun. 7, 2018

Related U.S. Application Data

(63) Continuation-in-part of application No. 15/498,716, filed on Apr. 27, 2017, now Pat. No. 9,921,336.
(Continued)

(30) Foreign Application Priority Data

Nov. 28, 2014 (KR) .................. 10-2014-0168795
Apr. 27, 2017 (KR) .................. 10-2017-0130067

(51) Int. Cl.
*G06T 17/05* (2011.01)
*H04W 4/33* (2018.01)
(Continued)

(52) U.S. Cl.
CPC ............ *G06T 17/05* (2013.01); *G01B 11/00* (2013.01); *G01V 8/20* (2013.01); *H04W 4/33* (2018.02); *H04W 4/02* (2013.01)

(58) Field of Classification Search
CPC .......... G06T 17/05; G01B 11/00; H04W 4/33; G01V 8/20
(Continued)

(56) References Cited

U.S. PATENT DOCUMENTS 6,459,092 B2 * 10/2002 Cho ............... G11B 5/6005
250/559.37
9,921,336 B2 * 3/2018 Jang ............... G01B 11/26
(Continued)

FOREIGN PATENT DOCUMENTS

JP 9-163268 A 6/1997
JP 3756019 B2 3/2006
(Continued)

OTHER PUBLICATIONS

International Search Report in PCT/KR2015/012813, dated Mar. 16, 2016.
(Continued)

*Primary Examiner* — Roy M Punnoose
(74) *Attorney, Agent, or Firm* — John H. Choi & Associates LLC

(57) ABSTRACT

Provided are a system and method of recognizing an indoor location of a moving object. A recognition device includes an illumination unit including a plurality of illumination modules respectively having different predetermined light receiving characteristics, each of the illumination modules receiving polarized light emitted from at least one lighting device according to one of the predetermined light receiving characteristics and measuring an illumination value; and an analysis unit configured to calculate a light source polarization axis angle of the at least one lighting device using a predetermined linear polarization rule and the illumination value measured by each illumination module, the at least one lighting device emitting light received by the illumination unit.

16 Claims, 9 Drawing Sheets

Related U.S. Application Data which is a continuation-in-part of application No. PCT/KR2015/012813, filed on Nov. 27, 2015.

(51) Int. Cl.
  *G01V 8/20* (2006.01)
  *G01B 11/00* (2006.01)
  *H04W 4/02* (2018.01)

(58) Field of Classification Search
  USPC .......................................................... 356/364
  See application file for complete search history.

(56) References Cited

U.S. PATENT DOCUMENTS

| | | |
|---|---|---|
| 2005/0285946 A1 | 12/2005 | Raynor |
| 2012/0313812 A1 | 12/2012 | Rastegar |
| 2017/0102449 A1* | 4/2017 | Jang ........................ G01B 11/26 |

FOREIGN PATENT DOCUMENTS

| | | |
|---|---|---|
| JP | 2007127567 A | 5/2007 |
| JP | 2014-215053 | 11/2014 |
| KR | 2001-060140 A | 3/2001 |
| KR | 2007-127567 A | 5/2007 |
| WO | 9519577 A1 | 7/1995 |
| WO | 9837434 A1 | 8/1998 |
| WO | 2014061079 A1 | 4/2014 |
| WO | WO2014061079 A1 | 4/2014 |

OTHER PUBLICATIONS

Written Opinion in PCT/KR2015/012813, dated Mar. 16, 2016.
WIPO, ISA/KR, International Search Report in Int'l App. No. PCT/KR2015/012813, dated Mar. 16, 2016.
WIPO, ISA/KR, Written Opinion in Int'l App. No. PCT/KR2015/012813, dated Mar. 16, 2016.

* cited by examiner

SYSTEM AND METHOD OF RECOGNIZING INDOOR LOCATION OF MOVING OBJECT

CROSS-REFERENCE TO RELATED APPLICATIONS

This application claims priority to and the benefit of Korean Patent Application No. KR 10-2014-0168795 filed in the Korean Intellectual Property Office on Nov. 28, 2014; Korean Application No. KR 10-2017-0130067 filed in the Korean Intellectual Property Office on Apr. 27, 2017; U.S. patent application Ser. No. 15/498,716 filed in the U.S. Patent and Trademark Office on Apr. 27, 2017; and PCT/KR2015/012813, filed the Korean Intellectual Property Office on Nov. 27, 2015, the entire contents of these applications are incorporated herein by reference.

TECHNICAL FIELD

The present invention relates to a system and method of recognizing an indoor location of a moving object.

BACKGROUND

A location based service (LBS) recognizes a user's location using positioning techniques and provides various kinds of information or services based on the recognition result.

Recently research into the LBS has focused on outdoor localization systems, and attention to and necessity of indoor localization have gradually increased.

With regard to indoor localization, Korean Patent Publication No. 2009-0090540 (entitled "Method for Providing LBS in Shadow Region and System, Lighting Fixture, Mobile Communication Terminal therefor") discloses an invention in which a lighting fixture having a function that combines location information stored in advance to generate identification (ID) information using frequency shift keying (FSK) modulation or spreading codes. Further, the function transmits the ID information at predetermined intervals through a lighting module of the lighting fixture.

Upon receiving ID information from lighting fixtures installed indoors, a mobile communication terminal including an ID information receiving module is configured to transmit the ID information to a service providing server, receive location based information such as map information from the service providing server, and display the location based information.

However, the ID information generator and the lighting module for transmitting ID information need to be installed in the lighting fixture in order to provide map information or the like for a user. And therefore, the invention disclosed in Korean Patent Publication No. 2009-0090540 has a problem of much increasing the price of lighting fixtures.

In addition, the ID information receiving module needs to be additionally installed in the mobile communication terminal and further, ID information needs to be transmitted to the service providing server and analyzed in order to recognize a location of the mobile communication terminal. Therefore, location information of the mobile communication terminal recognized by the service providing server may be inaccurate.

SUMMARY OF THE INVENTION

The present invention provides a system and method of recognizing an indoor location of a moving object, so that when the moving object receives polarized light from a lighting device, the location, moving direction and pose of the moving object are efficiently recognized.

The present invention also provides a system and method of recognizing an indoor location of a moving object, so that various additional services including an indoor location based service is provided through the recognition of the moving direction, the location, and the pose (e.g., a rotation angle in a three-dimensional (3D) spatial coordinate system defined by X, Y, and Z axes) of the moving object indoors.

Other objectives of the present invention will be clearly understood from the following description.

According to an aspect of an exemplary embodiment, there is provided an indoor location recognition system including a recognition device. The recognition device includes an illumination unit including a plurality of illumination modules respectively having different predetermined light receiving characteristics, each of the illumination modules receiving polarized light emitted from at least one lighting device among a plurality of lighting devices according to one of the predetermined light receiving characteristics and measuring an illumination value; and an analysis unit configured to calculate a light source polarization axis angle of the at least one lighting device using a predetermined linear polarization rule and the illumination value measured by each illumination module, the at least one lighting device emitting light received by the illumination unit. The plurality of lighting devices may be installed indoors and may be configured to have different light source polarization axis angles, respectively, according to which polarized light is emitted. The lighting devices may include overlapping lighting devices configured to have unique lighting time periods, respectively.

The light source polarization axis angle may be mapped to location information of the recognition device using predetermined matching map information.

The illumination modules may include an unpolarized illumination module configured to receive linearly polarized light emitted from the at least one lighting device and calculate an unpolarized illumination value; and a polarized illumination module including a module polarizer having a predetermined module polarization axis angle, the polarized illumination module being configured to receive polarized light emitted from the at least one lighting device through the module polarizer and calculate a polarized illumination value. The analysis unit may calculate an angle difference between the light source polarization axis angle and the module polarization axis angle using the linear polarization rule predetermined about a relation between the unpolarized illumination value and the polarized illumination value and may calculate the light source polarization axis angle using the angle difference.

The recognition device may further include a sensor unit configured to generate sensing information corresponding to a rotation angle of the recognition device with respect to a predetermined reference direction. The analysis unit may apply the rotation angle to the angle difference and calculate the light source polarization axis angle with respect to the predetermined reference direction.

Alternatively, the illumination modules may include a first polarized illumination module including a first module polarizer having a first predetermined module polarization axis angle, the first polarized illumination module being configured to receive polarized light emitted from the at least one lighting device through the first module polarizer and calculate a first polarized illumination value; and a second polarized illumination module including a second module polarizer having a second predetermined module polarization axis angle, the second polarized illumination module being configured to receive polarized light emitted from the at least one lighting device through the second module polarizer and calculate a second polarized illumination value. At this time, the analysis unit may calculate an angle difference between the light source polarization axis angle and the first module polarization axis angle using the linear polarization rule predetermined about a relation between the first polarized illumination value and the second polarized illumination value and may calculate the light source polarization axis angle using the angle difference.

The recognition device may further include a sensor unit configured to generate sensing information corresponding to a rotation angle of the recognition device with respect to a predetermined reference direction. The analysis unit may apply the rotation angle to the angle difference and calculate the light source polarization axis angle with respect to the predetermined reference direction.

As another alternative, each of the illumination modules may include a plurality of sub illumination modules and may be positioned on a corresponding one of a plurality of surfaces of a three-dimensional (3D) figure. Each of the sub illumination modules may include a sub module polarizer and an illuminometer, the sub module polarizer having a predetermined sub module polarization axis angle. The sub illumination modules may be configured to have different sub module polarization axis angles, respectively. Three considered target surfaces selected from among the plurality of surfaces of the 3D figure may be at positions which the polarized light emitted from the at least one lighting device reaches, and the three considered target surfaces may meet a condition that an area vector of one of the three considered target surfaces is not synthesized from area vectors of the other two considered target surfaces among the three considered target surfaces.

The 3D figure may have a concrete shape or may be a virtual 3D figure formed when a considered target surface, on which each illumination module is positioned, is virtually extended.

The analysis unit may calculate a lighting direction vector using the predetermined linear polarization rule, according to which the lighting direction vector corresponding to the at least one lighting device emitting the light incident on each illumination module positioned on a corresponding considered target surface among the three considered target surfaces is calculated using the illumination value measured in each illumination module and a normal vector of the corresponding considered target surface.

The recognition device may further include a sensor unit configured to generate sensing information corresponding to a rotation angle of the recognition device with respect to a predetermined reference direction. The analysis unit may convert the calculated lighting direction vector into a lighting direction vector in a predetermined reference coordinate system by applying the rotation angle to the calculated lighting direction vector.

The analysis unit may calculate an intersection line vector of each of the three considered target surfaces using illumination values respectively measured in the sub illumination modules positioned on each considered target surface, may calculate an acquired polarization surface of the 3D figure using the intersection line vector of each considered target surface, and may acquire the light source polarization axis angle from the calculated acquired polarization surface.

At this time, the recognition device may further include a sensor unit configured to generate sensing information corresponding to a rotation angle of the recognition device with respect to a predetermined reference direction. The analysis unit may convert the calculated acquired polarization surface into an acquired polarization surface in the predetermined reference coordinate system by applying the rotation angle to the calculated acquired polarization surface, and may acquire the light source polarization axis angle based on the acquired polarization surface in the predetermined reference coordinate system.

According to an aspect of another exemplary embodiment, there is provided an indoor location recognition method performed in a recognition device. The indoor location recognition method includes receiving illumination values respectively measured in a plurality of illumination modules according to predetermined light receiving characteristics, the plurality of illumination modules respectively having the predetermined light receiving characteristics which are different from one another; and calculating a light source polarization axis angle of at least one lighting device among a plurality of lighting devices using a predetermined linear polarization rule and the illumination values measured in the respective illumination modules, the at least one lighting device emitting light received by an illumination unit including the illumination modules. The plurality of lighting devices may be installed indoors and may be configured to have different light source polarization axis angles, respectively, according to which polarized light is emitted. The lighting devices may include overlapping lighting devices configured to have unique lighting time periods, respectively.

The light source polarization axis angle may be mapped to location information of the recognition device using predetermined matching map information.

Other aspects, features, and advantages than those described above will be clear from the descriptions of the drawings, claims, and mode of the invention below.

According to embodiments of the present invention, the location, moving direction and pose of a moving object is immediately recognized just by the moving object receiving light emitted from a lighting device.

In addition, various additional services including an indoor location based service may be provided through the recognition of the moving direction, the location, and the pose (e.g., a rotation angle in a three-dimensional (3D) spatial coordinate system defined by X, Y, and Z axes) of the moving object indoors.

BRIEF DESCRIPTION OF THE FIGURES

Embodiments of the present invention will be more clearly understood from the following detailed description taken in conjunction with the accompanying drawings in which.

DETAILED DESCRIPTION OF THE INVENTION

Figure 1:
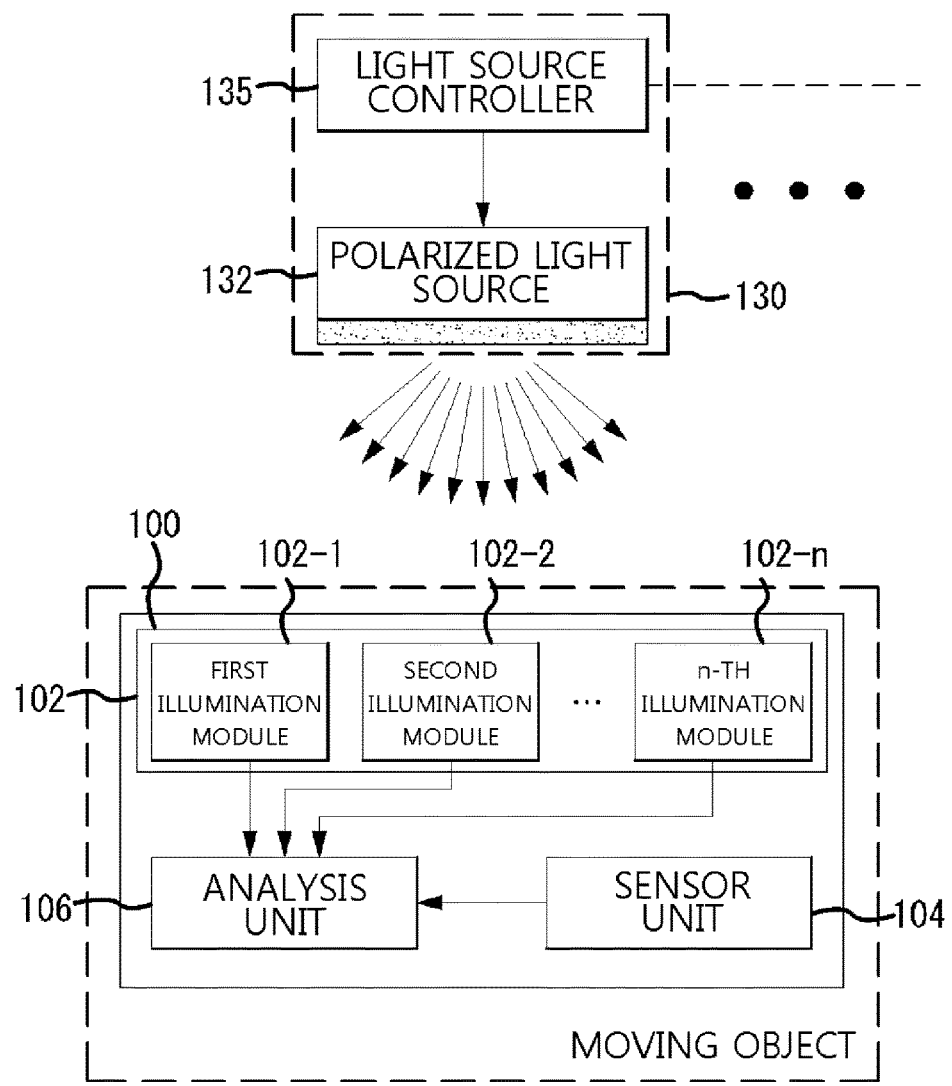
FIG. 1 is a schematic block diagram of an indoor location recognition system according to some embodiments of the present invention.

Reference will now be made in detail to embodiments, examples of which are illustrated in the accompanying drawings. In this regard, the present embodiments may have different forms and should not be construed as being limited to the descriptions set forth herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, numbers, steps, operations, elements, and/or components, but do not preclude the presence or addition of one or more other features, numbers, steps, operations, elements, components, and/or groups thereof.

As used herein, terminology such as "part", "unit", "module", "~or", and "~er" may indicate a unit which processes at least one function or operation and may be implemented by hardware, software, or a combination thereof.

It will be understood that the terms first, second, etc. and the numerals 102-2, 102-2, etc. are only used to distinguish one element from another, and these elements should not be limited by these terms. Accordingly, a first element could be termed a second element.

Elements of an embodiment described with reference to drawing are not limitedly applied only to the current embodiment and may be implemented to be included in another embodiment without departing from the scope of the technical spirit of the present invention. Although not described, it should be construed that a plurality of embodiments are integrated into one embodiment.

Embodiments of the present invention will be described in detail with reference to the accompanying drawings, wherein like reference numerals refer to like elements throughout and redundant description thereof will be omitted. In describing the present invention, when it is determined that the detailed description of the publicly known art related to the present invention may unnecessarily obscure the gist of the present invention, the detailed description thereof will be omitted.

FIG. 1 is a schematic block diagram of an indoor location recognition system according to some embodiments of the present invention. FIGS. 2A through 4C are diagrams for explaining an indoor location recognition method used by a recognition device, according to a first embodiment of the present invention. FIG. 5 is a diagram for explaining a Mueller matrix as an example of a linear polarization rule.

Referring to FIG. 1, the indoor location recognition system may include a recognition device 100 and a plurality of lighting devices 130. Although not show, the indoor location recognition system may also include a management server.

Figure 2A:
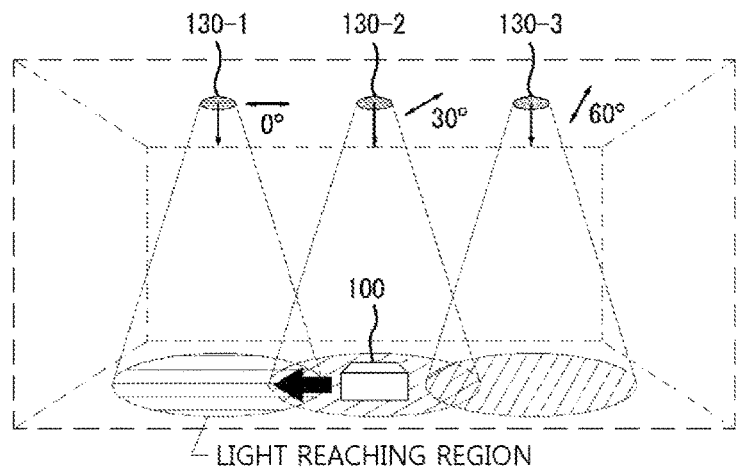
FIGS. 2A through 4C are diagrams for explaining an indoor location recognition method used by a recognition device, according to a first embodiment of the present invention.
Figure 2B:
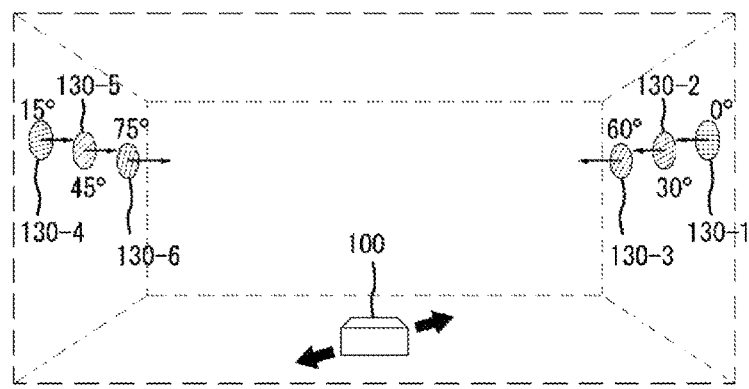

The lighting devices 130 may be installed at an upper part (e.g., a ceiling) and/or a wall of an indoor space, as shown in FIGS. 2A and 2B. The lighting devices 130 are configured to emit light linearly polarized along a light source polarization axis having a predetermined angle value.

Hereinafter, lighting devices will be respectively denoted by separate reference numerals such as 130-1, 130-2, etc. only when they need to be individually described. Otherwise, the lighting devices will be generally denoted by reference numeral 130.

As shown in FIG. 1, each of the lighting devices 130 may include a polarized light source 132 and a light source controller 135.

The polarized light source 132 is configured to emit polarized light according to a predetermined polarization characteristic. At this time, polarized light sources 132 respectively included in the lighting devices 130 may have different polarization characteristics from one another.

The polarized light source 132 may be implemented as a light source with a polarizing film attached thereto, a polarizing lamp, or a light source equipped with a polarizing filter. To configure the lighting devices 130 to have different polarization characteristics, a polarizing film may be attached to the polarized light source 132 of each lighting device 130 such that the polarized light source 132 has a different light source polarization axis angle. Accordingly, the lighting devices 130 may emit polarized light according to different light source polarization axis angles, respectively.

Figure 3A:
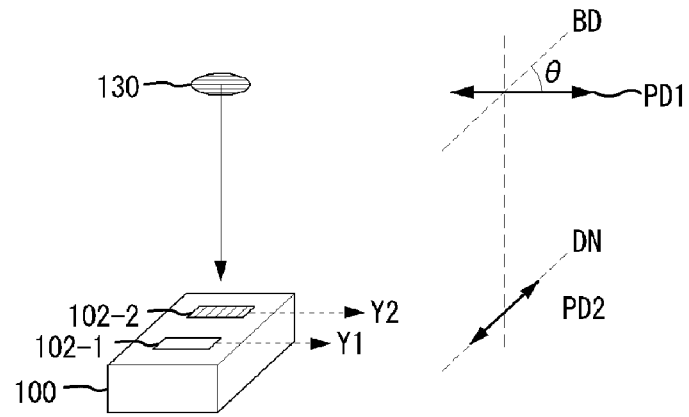
Figure 4A:
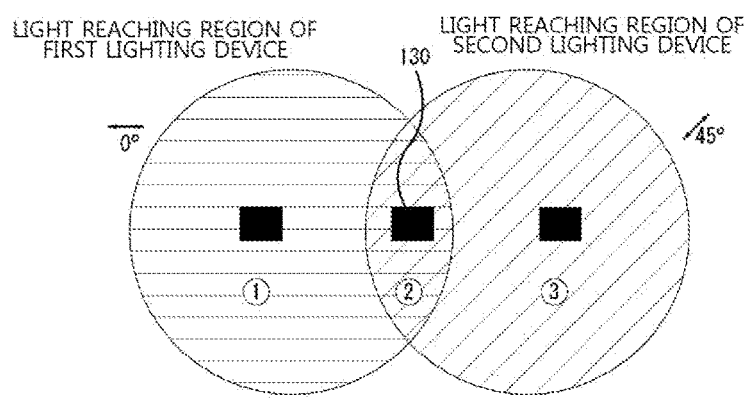

As denoted by "θ" in FIG. 3A, a light source polarization axis angle refers to an angle at which a light transmission axis rotates or tilts with respect to a predetermined reference direction BD (e.g., at least one among a due north direction, the direction of gravity, etc.).

For example, when a lighting device 130 is installed at a ceiling, a polarization direction (i.e., linear polarization) may be set to have a certain angle with respect to a direction perpendicular to a rotation axis in the direction of gravity. In detail, the light source polarization axis angle of each lighting device 130 may be preset to a different angle such as 0, 30, or 60 degrees based on the rotation axis and the due north direction (see FIG. 2A).

In the same manner, when a lighting device 130 is installed at a wall, linear polarization perpendicular to a rotation axis in the due north direction may be set, and a transmission axis angle may be set based on the rotation axis and the direction of gravity (see FIG. 2B).

Referring back to FIG. 1, the polarized light source 132 may be controlled by the light source controller 135 to flicker at predetermined intervals.

Figure 4B:
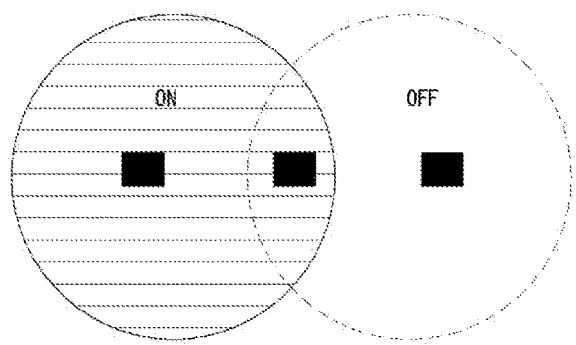
Figure 4C:
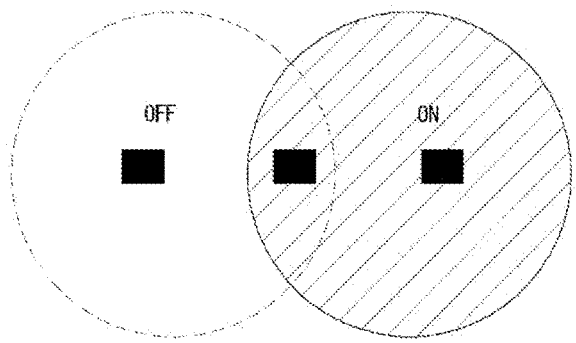
Figure 5:
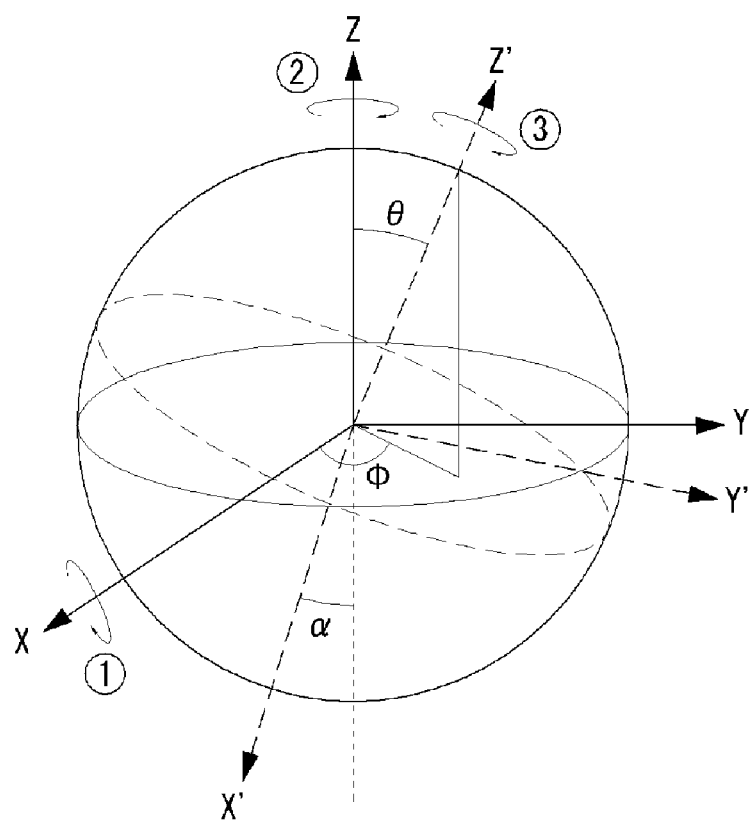
FIG. 5 is a diagram for explaining a Mueller matrix as an example of a linear polarization rule.

For indoor location recognition of the recognition device 100, a plurality of polarized light sources 132 installed in one range (i.e., a range unit) having a predetermined size are respectively allocated predetermined unique lighting time periods such that only one polarized light source 132 illuminates in the range (see FIGS. 4B and 4C).

A range unit is a range, in which a lighting device emitting light reaching a location where the recognition device 100 may be placed indoors is included, and may be predetermined.

For example, it may be said that a first lighting device among the lighting devices 130 is installed in a range unit in terms of a light reaching region $\hat{1}$ in FIGS. 4A through 4C and that first and second lighting devices among the lighting devices 130 are installed in the range unit in terms of a light reaching region $\hat{2}$ in FIGS. 4A through 4C. In terms of the light reaching region $\hat{2}$, the first and second lighting devices may be referred to as overlapping lighting devices.

When each lighting device 130 has a flickering interval such that the lighting device 130 is off for 0.05 seconds per second, a first lighting device 130-1 may be set to be on during a time period of 0.05 to 0.5 seconds and a time period of 0.55 seconds to 1 second while a second lighting device 130-2, i.e., an overlapping lighting device adjacent to the first lighting device 130-1, may be set to be on during a time period of 0 to 0.45 seconds and a time period of 0.5 to 0.95 seconds.

At this time, as shown in FIGS. 4A through 4C, there are a time period during which all overlapping lighting devices are on and time periods during which only one overlapping lighting device is on (i.e., a time period of 0 to 0.05 seconds during which only the second lighting device is on and a time period of 0.45 to 0.5 seconds during which only the first lighting device is on).

Accordingly, when the recognition device 100 moves from a region which light emitted from the second lighting device 130-2 only reaches to a region which light emitted from both the first and second lighting devices 130-1 and 130-2 reaches, as shown in FIG. 2A, it may be recognized that a current location of the recognition device 100 corresponds to a light reaching region of which of the lighting devices 130 through illumination calculation which will be described below, so that the location, moving direction, moving distance, pose, etc. of the recognition device 100 may be recognized.

The term 'pose' used herein should be interpreted as including, for example, a rotational state corresponding to rotational angle information in a three-dimensional (3D) space. The recognition device 100 may recognize a pose of a moving object by analyzing degrees at which the moving object rotates and tilts with respect to a horizontal direction and/or a vertical direction.

Referring back to FIG. 1, the light source controller 135 controls the polarized light source 132 to flicker at a predetermined interval.

The light source controller 135 may be connected, in a wired or wireless manner, to another light source controller of each of all other lighting devices or adjacent lighting devices to communicate flickering control information with each other, so that the light source controller 135 may control a lighting device 130 to have a unique lighting time period.

Alternatively, the light source controller 135 may receive a flickering control signal from a management server connected through a wired or wireless communication network and may control the polarized light source 132 to flicker according to the flickering control signal.

As another alternative, the light source controller 135 may receive information for flickering control from the management server and store the information in a storage (not shown) included in the lighting device 130 or may control flickering operation of the polarized light source 132 using information for flickering control, which has been stored in the storage during installation of the lighting device 130.

It is apparent that there may be various methods of controlling the operation of the polarized light source 132 using the light source controller 135 to secure each of polarized light sources 132 at least in a region unit to have a unique lighting time period.

Although the light source controller 135 is included in each of the lighting devices 130 in the first embodiment illustrated in FIG. 1, a single light source controller may be configured to individually control the lighting devices 130 so that the polarized light source 132 included in each of the lighting devices 130 flickers at a predetermined interval in another embodiment.

The recognition device 100 may include an illumination unit 102, a sensor unit 104, and an analysis unit 105.

The recognition device 100 movable in an indoor space may be configured to be mounted on one side of a moving object (e.g., a robot cleaner) having a powered wheel at the bottom thereof, to be attached to or carried with a moving object (e.g., a visitor in an art gallery) moving around indoor, or in other various manners.

The illumination unit 102 may include at least two illumination modules. The illumination modules may be preset to have different light receiving characteristics.

For example, as in the first embodiment described below, the illumination unit 102 may include a first illumination module 102-1 (i.e., an unpolarized illumination module) not including a polarizer and a second illumination module 102-2 (i.e., a polarized illumination module) including a polarizer (see FIG. 2C).

In other words, a polarized illumination module includes a module polarizer and an illuminometer to polarize incident light and measure an illumination value. An unpolarized illumination module includes an illuminometer measuring an illumination value of incident light but does not include a module polarizer.

In another example, as in a second embodiment described below, the illumination unit 102 may include the first and second illumination modules 102-1 and 102-2 which are polarized illumination modules. Module polarizers respectively included in the first and second illumination modules 102-1 and 102-2 may be installed to have different module polarization axis angles (see FIG. 6A).

In yet another example, as in a third embodiment described below, the illumination unit 102 may include first through third illumination modules 102-1 through 102-3. The first through third illumination modules 102-1 through 102-3 may be respectively provided on surfaces of a 3D figure, and module polarizers provided on the respective surfaces may have different module polarization axis angles (see FIGS. 7A through 7E).

The first embodiment will be described with reference to FIGS. 1 through 4C.

Figure 3B:
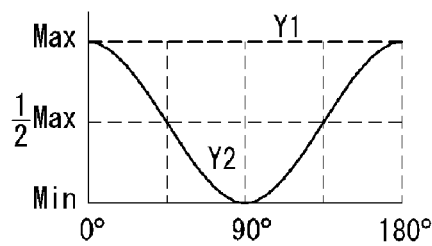
Figure 3C:
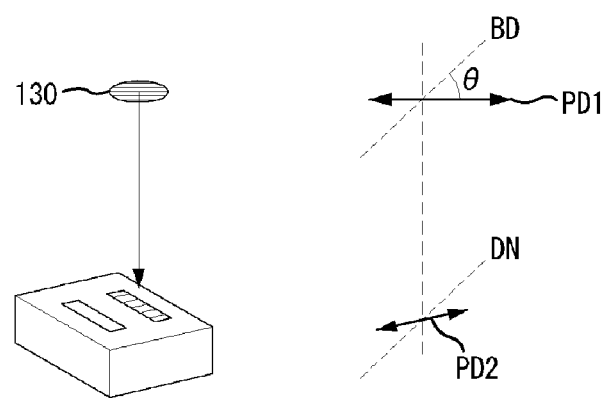

As shown in FIGS. 3A through 3C, the polarized light source 132 emits linearly polarized light according to a light source polarization axis PD1 defined by a light source polarization axis angle "θ". An unpolarized illumination module, i.e., the first illumination module 102-1, and a polarized illumination module, i.e., the second illumination module 102-2, included in the illumination unit 102 measures an illumination value of incident light emitted from the lighting device 130 and provides the illumination value to the analysis unit 106. At this time, the polarized illumination module measures the illumination value of light that has been received and then polarized by a module polarizer therein.

Figure 2C:
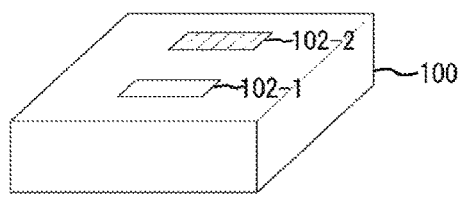

Although the recognition device 100 has a flat top on which the unpolarized illumination module 102-1 and the polarized illumination module 102-2 are mounted in the embodiment illustrated in FIG. 2C, the recognition device 100 may have sloping top surfaces.

In some embodiments, a plurality of pairs of an unpolarized illumination module and a polarized illumination module may be provided at predetermined positions. At this time, illumination values Y1 and Y2, which will be described below, may be respectively an average of illumination values measured by a plurality of unpolarized illumination modules and an average of illumination values measured by a plurality of polarized illumination modules.

An unpolarized illumination module does not include a module polarizer (e.g., a polarizing film). An illuminometer included in the unpolarized illumination module directly receives polarized light from the lighting device 130 and measures a first illumination value (Y1 in FIG. 3B), which may be referred to as an unpolarized illumination value.

A polarized illumination module includes a module polarizer having a predetermined module polarization axis (PD2 in FIGS. 3A and 3C). An illuminometer included in the polarized illumination module measures a second illumination value (Y2 in FIG. 3B) of incident light which has been polarized by the lighting device 130 and then polarized again by the module polarizer. The second illumination value may be referred to as a polarized illumination value.

The module polarization axis PD2 of a module polarizer included in a polarized illumination module to linearly polarize incident light may be preset to have a predetermined angle (referred to as a module polarization axis angle) with respect to the predetermined reference direction BD (e.g., at least one among a due north direction DN and the direction of gravity). For example, when the module polarization axis angle has been set to 0 degrees, the analysis unit 106 may recognize that the module polarization axis PD2 has been set to the due north direction DN.

As described above, a polarized illumination module measures an illumination value of light, which has been polarized by the polarized light source 132 according to a polarization axis and then polarized again by a module polarizer. Accordingly, the polarized illumination value Y2 may be equal to or less than the unpolarized illumination value Y1 according to an angle difference between the light source polarization axis PD1 and the module polarization axis PD2.

The analysis unit 106 may calculate a light source polarization axis angle of at least one lighting device 130, which has emitted light to the recognition device 100, using illumination values respectively measured by an unpolarized illumination module and a polarized illumination module and a predetermined linear polarization rule.

Since a plurality of the lighting devices 130 are configured to have light source polarization axes, respectively, according to different light source polarization axis angles, respectively, the analysis unit 106 may identify each lighting device 130 using a calculated light source polarization axis angle and may match the light source polarization axis angle to indoor location information based on predetermined matching map information. In other words, the analysis unit 106 may analyze the indoor location of the recognition device 100 by recognizing the lighting device 130 which has emitted light incident on the recognition device 100.

Here, the predetermined linear polarization rule is defined using, for example, at least one among Malus's law, Mueller matrix, Jones matrix, etc. related to polarization and is also defined based on the principle of trigonometric function to calculate a light source polarization axis angle. Since the principle and details of Malus's law, Mueller matrix, Jones matrix are well known to those skilled in the art, detailed descriptions thereof will be omitted. A process performed by the recognition device 100 using each linear polarization rule will be briefly described below.

For example, it is assumed that the predetermined linear polarization rule is defined using Malus's law. Referring to an illumination curve (see FIG. 3B) according to Malus's law, the polarized illumination value Y2 measured by a polarized illumination module is maximum when a angle difference between the module polarization axis PD2 and the light source polarization axis PD1 is 0 or 180 degrees.

At this time, the maximum of the polarized illumination value Y2 may be the same as the unpolarized illumination value Y1 measured by an unpolarized illumination module. However, there may be a difference between the first illumination value Y1 and the second illumination value Y2 due to maximum transmissivity Z of a module polarizer included in the polarized illumination module (see Equation 1 below).

Referring back to FIG. 1, the sensor unit 104 generates sensing information regarding a pose (e.g., a rotation angle in a 3D spatial coordinate system defined by X, Y, and Z axes) of the recognition device 100 and provides the sensing information to the analysis unit 106.

The sensor unit 104 may include at least one among a geo-magnetic sensor, a gravity sensor, etc. to generate the sensing information based on the predetermined reference direction BD (e.g., the due north direction DN and/or the direction of gravity).

As described above, when the recognition device 100 continuously maintains a default pose such that the module polarization axis PD2 of the polarized illumination module is maintained in an initial direction, the rotation of the recognition device 100 may not be considered.

However, as compared between FIG. 3A and FIG. 3C, when the recognition device 100 rotates in the horizontal direction and/or the vertical direction, the module polarization axis angle of the polarized illumination module changes by the rotation angle.

For this reason, when the module polarization axis angle changes even though the recognition device 100 stays at the same location, the polarized illumination value Y2 is changed according to the pose of the recognition device 100 due to a polarization characteristic caused by the module polarization axis PD2 and the light source polarization axis PD1. Although cases where the recognition device 100 rotates in the horizontal direction are described herein, it is apparent that the same technological spirit may be applied to cases where the recognition device 100 rotates (or tilts) in the vertical direction.

Accordingly, in order to obtain an accurate light source polarization axis angle of a lighting device 130 which has emitted linearly polarized light, the analysis unit 106 needs to recognize a pose of the recognition device 100, which has caused the change in the module polarization axis angle, and needs to return the recognition device 100 to the default pose (i.e., the pose of the recognition device 100 allowing the module polarization axis PD2 to be in the initial direction) before performing analysis.

Referring back to FIG. 1, the analysis unit 106 receives a polarized illumination value measured by a polarized illumination module and an unpolarized illumination value measured by an unpolarized illumination module, receives sensing information corresponding to a pose of the recognition device 100 from the sensor unit 104, and calculates a light source polarization axis angle of the lighting device 130 which has emitted polarized light incident on the recognition device 100. The analysis unit 106 may also recognize the pose of the recognition device 100 using the sensing information.

The analysis unit 106 may transmit information about the light source polarization axis angle to a management server (not shown) and may receive information about a current location of the recognition device 100 (e.g., information indicating that the recognition device 100 is in a light reaching region corresponding to a particular lighting device) from the management server. At this time, matching map information regarding a light source polarization axis angle and a light reaching region of each lighting device may be stored in advance and managed in the management server.

Alternatively, when the recognition device 100 includes a storage storing this matching map information, the analysis unit 106 may recognize the current location of the recognition device 100, based on the matching map information stored in the storage.

Hereinafter, a method of recognizing a lighting device corresponding to a light reaching region, in which the recognition device 100 is located, using illumination values and sensing information in the analysis unit 106 will be briefly described.

As shown in FIG. 3B, even though the polarized light source 132 is configured to have a light source polarization axis angle of θ1 and emits polarized light according to the light source polarization axis angle of θ1, the first illumination value Y1 is measured to be constant in an unpolarized illumination module.

However, in a polarized illumination module including a module polarizer having a module polarization axis angle of θ2, the second illumination value Y2 measured based on an angle difference (i.e., X=θ1−θ2) between a light source polarization axis angle and a module polarization axis angle, which are set as polarization characteristics, changes.

At this time, the polarized illumination value Y2 measured in the polarized illumination module changes along a $\cos^2$ illumination curve according to Malus's law. The maximum of the polarized illumination value Y2 corresponds to the unpolarized illumination value Y1 measured in the unpolarized illumination module and is measured when the angle difference X is 0 or 180 degrees.

Accordingly, the relationship among the polarized illumination value Y2 measured in the polarized illumination module, the unpolarized illumination value Y1 measured in the unpolarized illumination module, and the angle difference X may be defined as Equation 1:

$$Y2 = Y1 \times (\cos^2 X) \times Z \qquad (1)$$

Since the unpolarized illumination value Y1, the polarized illumination value Y2, and the maximum transmissivity Z of the module polarizer included in the polarized illumination module are already known, the angle difference X between a light source polarization axis angle and a module polarization axis angle may be calculated using Equation 1.

When the recognition device 100 is in the default pose, the light source polarization axis angle of θ1 of a lighting device 130 may be immediately calculated from the angle difference X=θ1−θ2 calculated using Equation 1 since the module polarization axis angle of θ2 is a predetermined value already known.

However, when the recognition device 100 does not maintain the default pose, the pose of the recognition device 100 needs to be additionally considered.

At this time, the analysis unit 106 may recognize a rotation angle R with respect to the predetermined reference direction BD (e.g., at least one among the due north direction DN, the direction of gravity, etc.) using the sensing information received from the sensor unit 104.

The analysis unit 106 may additionally apply the rotation angle R, which corresponds to a displacement from the default pose of the recognition device 100, to the angle of θ1 or θ2 calculated from the angle difference X=θ1−θ2 to calculate the light source polarization axis angle of θ1. It is apparent that the analysis unit 106 may recognize the pose of the recognition device 100 based on the rotation angle R.

The analysis unit 106 recognizing a location, pose, etc. of a moving object is included in the recognition device 100 in the embodiment illustrated in FIG. 1. However, the analysis unit 106 may be provided in an independent device which is connected to the recognition device 100 through a communication network and may operate in conjunction with the recognition device 100. In this case, the recognition device 100 may include a transmitter which transmits information about an illumination value measured by each illumination module to the independent device provided with the analysis unit 106. Even when the analysis unit 106 is provided in the independent device, the analysis unit 106 is connected to the recognition device 100 and operates in conjunction with the recognition device 100, and therefore, the analysis unit 106 is described herein as an element of the recognition device 100.

A method of recognizing a current indoor location of the recognition device 100 as the light reaching region $\hat{1}$, $\hat{2}$, or $\hat{3}$ will be briefly described with reference to FIGS. 4A through 4C below.

As described above, lighting devices installed in one range unit are configured to have different flickering intervals and different light source polarization axis angles.

Accordingly, the recognition device 100 located in the light reaching region $\hat{1}$ receives only polarized light emitted from the first lighting device for a predetermined time period and calculates only a light source polarization axis angle (e.g., 0 degrees) of the first lighting device. Therefore, the recognition device 100 is able to recognize based on the matching map information that the current indoor location is in the light reaching region of the first lighting device only.

When the recognition device 100 is located in the light reaching region $\hat{2}$, the recognition device 100 alternately receives polarized light emitted from the first lighting device and polarized light emitted from the second lighting device for the predetermined time period.

At this time, the recognition device 100 alternately calculates a light source polarization axis angle (e.g., 0 degrees) of the first lighting device and a light source polarization axis angle (e.g., 45 degrees) of the second lighting device. Therefore, the recognition device 100 is able to recognize based on the matching map information that the current indoor location is in an intersection region between the light reaching region of the first lighting device and the light reaching region of the second lighting device.

When the recognition device 100 is located in the light reaching region $\hat{3}$, the recognition device 100 receives only polarized light emitted from the second lighting device for the predetermined time period and calculates only a light source polarization axis angle (e.g., 45 degrees) of the second lighting device. Therefore, the recognition device 100 is able to recognize based on the matching map information that the current indoor location is in the light reaching region of the second lighting device only.

As described above, the recognition device 100 may calculate a light source polarization axis angle of each lighting device 130 using an illumination value measured after receiving polarized light emitted from the lighting device 130 and may recognize the indoor location of a moving object at which the recognition device 100 is provided.

In addition, the recognition device 100 may recognize the moving direction and distance of the moving object using a change in the light source polarization axis angle and may also recognize the pose of the moving object using the sensing information received from the sensor unit 104.

The indoor location information and the pose information recognized by the recognition device 100 may be used for providing various additional services indoors, for example, providing optimal information about a work of art for a visitor in an art gallery, and may also be used in various ways to efficiently control an electronic device, such as a robot cleaner, which works moving around indoors.

Cases where Malus's law is used as a linear polarization rule have been described, but either a Mueller matrix or a Jones matrix may also be used as the linear polarization rule in the embodiments of the present invention.

FIG. 5 shows a 3D space defined by a Mueller matrix to analyze a light amount change characteristic with respect to the position of a polarization axis. In the 3D space, the position of the polarization axis and a rotation angle with respect to a light emission direction may be defined and may be used to derive Equation 2 below.

The image of the 3D space shown in FIG. 5 is an improved version of that disclosed on pages 52 and 53 of the book entitled "Polarized Light and the Mueller Matrix Approach" [Jose Jorge Gil Perez and Razvigor Ossikovski, CRC Press, A Taylor & Francis Book].

In a 3D space defined by X, Y, and Z axes, the X axis is rotated by θ and the Z axis is rotated by Φ—90° to produce a 3D space defined by X', Y', and Z' axes, and the Z' axis is rotated by α.

When each 3D space is compared with an indoor location recognition system according to an embodiment of the present invention, the X axis may be a module polarization axis vector of an illumination module, the Z axis may be an area vector of a polarizer included in the illumination module, the Y axis may be a vector perpendicular to both the X and Z axes, the X' axis may be a light source polarization axis vector of polarized light emitted from a lighting device 130, the Z' axis may be an emission direction vector of the polarized light emitted from the lighting device 130, and the Y' axis may be a vector perpendicular to both the X' and Z' axes.

In addition, θ is an angle between the Z axis and Z' axis, Φ is an angle between the X axis and a vector created when a foot of perpendicular is drawn from a point on the Z' axis to an XY plane, and α is an angle between the X' axis and an intersecting axis between the XY plane and an X'Y' plane.

At this time, when it is assumed that each illumination module included in the illumination unit 102 of the recognition device 100 and the polarized light source 132 of each lighting device 130 are all configured to linearly polarize light, the polarization axis of the lighting device 130 in the coordinate system (defined by the X, Y, and Z axis) of the illumination module may be expressed as a determinant as shown in Equation 2:

$$\epsilon = \sqrt{I} \begin{pmatrix} \sin\Phi\cos\alpha + \cos\theta\cos\Phi\sin\alpha \\ -\cos\Phi\cos\alpha + \cos\theta\sin\Phi\sin\alpha \\ -\sin\theta\sin\alpha \end{pmatrix}, \quad (2)$$

where ε is an amplitude of an electromagnetic field (i.e., an amplitude of a polarized light wave) and I is the light amount of the polarized light source 132 (i.e., the intensity of polarized light).

Here, the module polarization axis of the illumination module corresponds to the X axis, and therefore, the square of sinΦcosα+cosθcosΦsinα, i.e., an x-element of the matrix defined by Equation 2, is proportional to the amount of light finally measured in an illuminometer after the light passes through a module polarizer in the illumination module.

When the lighting device 130 and the illumination module are fixed to be parallel with each other, the Z axis coincides with the Z' axis, so that θ is 0 degrees and Φ is fixed to 90 degrees. Therefore, it can be seen that the amount of light is proportional to the square of cosα, as in Malus's law.

As described above, according to some embodiments of the present invention, the recognition device 100 may calculate a light source polarization axis angle of at least one lighting device, which emits light to an illumination module, using a predetermined linear polarization rule. Here, the predetermined linear polarization rule is defined using, for example, at least one among Malus's law, Mueller matrix, Jones matrix, etc. related to polarization and is also defined based on the principle of trigonometric function to calculate a light source polarization axis angle.

The calculated light source polarization axis angle may be matched to indoor location information based on predetermined matching map information, so that the current location of the recognition device 100 indoors may be recognized.

Figure 6A:
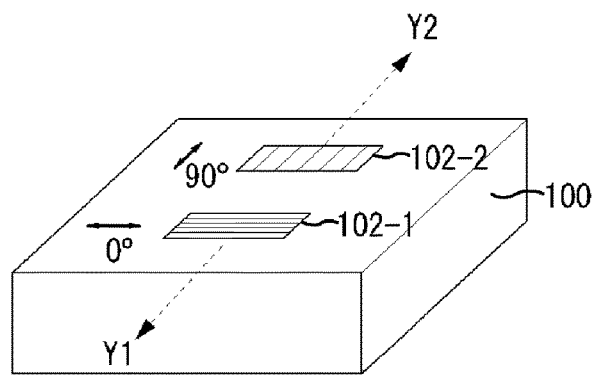
FIGS. 6A and 6B are diagrams for explaining an indoor location recognition method used by a recognition device, according to a second embodiment of the present invention.
Figure 6B:
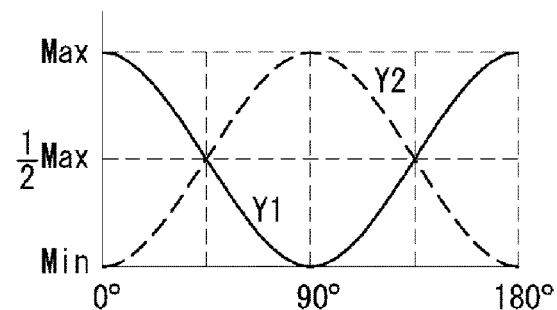

FIGS. 6A and 6B are diagrams for explaining an indoor location recognition method used by a recognition device, according to a second embodiment of the present invention. The redundant details described above and the details easily inferred from the description made in explaining the first embodiments above will be omitted in describing the second embodiment below.

Referring to FIG. 6A, the illumination unit 102 of the recognition device 100 provided at a moving object includes the first illumination module 102-1 and the second illumination module 102-2 which respectively include module polarizers respectively having different module polarization axis angles.

For example, a first module polarizer included in the first illumination module 102-1 may be configured to have a first module polarization axis coinciding with a predetermined reference direction (e.g., the due north direction) while a second module polarizer included in the second illumination module 102-2 may be configured to have a second module polarization axis having an angle difference (of, for example, 90 degrees) from the predetermined reference direction.

An illuminometer included in the first illumination module 102-1 measures the first illumination value Y1 of light polarized by the first module polarizer, and an illuminometer included in the second illumination module 102-2 measures the second illumination value Y2 of light polarized by the second module polarizer.

At this time, an illumination value measured by an illuminometer may be different according to a module polarization axis angle of a module polarizer. FIG. 6B is a graph of illumination values when a difference between the module polarization axis angles of the respective module polarizers respectively included in the first and second illumination modules 102-1 and 102-2 is 90 degrees.

Here, it is assumed that an angle difference between a polarization direction (i.e., a light source polarization axis) of the lighting device 130 and a polarization direction (i.e., a first module polarization axis) of the module polarizer of the first illumination module 102-1 is X, the first and second module polarization axes have a 90-degree difference therebetween, and the brightness of the lighting device 130 is LUX. In this case, the first illumination value Y1 is measured as $\cos^2(X) \times LUX$ and the second illumination value Y2 is measured as $\sin^2(X) \times LUX$.

Accordingly, the analysis unit 106 may calculate the angle difference X between the light source polarization axis and the first module polarization axis using Equation 3:

$$X = a\cos\sqrt{\frac{Y1}{(Y1+Y2)}}. \quad (3)$$

However, when the recognition device 100 does not maintain the default pose, the pose of the recognition device 100 needs to be additionally considered, as described above. In other words, the analysis unit 106 may recognize the rotation angle R with respect to a predetermined reference direction (e.g., at least one among the due north direction, the direction of gravity, etc.) using the sensing information received from the sensor unit 104 and may calculate the light source polarization axis angle of θ1 by additionally using the rotation angle R.

A method of calculating the angle difference X between the light source polarization axis and the first module polarization axis when the module polarizers respectively included in the first and second illumination modules 102-1 and 102-2 are installed to have a 90-degree module polarization angle difference therebetween has been described with reference to FIGS. 6A and 6B.

However, even in other cases where the module polarizers are installed such that a difference between a first module polarization axis angle and a second module polarization axis angle is other than 90 degrees, an equation used to calculate the angle difference X between the light source polarization axis and the first module polarization axis may be rewritten in various ways using the general principle of trigonometric function.

FIGS. 7A through 10 are diagrams for explaining an indoor location recognition method used by a recognition device, according to a third embodiment of the present invention.

Referring to FIGS. 7A through 7E, the illumination unit 102 of the recognition device 100 provided at a moving object includes the first illumination module 102-1, the second illumination module 102-2, and a third illumination module 102-3 of which each includes a module polarizer.

The first through third illumination modules 102-1 through 102-3 are positioned on respective surfaces of a 3D figure formed at one side of the recognition device 100. The 3D figure at which the first through third illumination modules 102-1 through 102-3 are positioned may have a concrete shape or may be a virtual 3D figure formed when the surfaces, on which the respective first through third illumination modules 102-1 through 102-3 are positioned, are virtually extended and connected to one another.

However, the 3D figure having a surface (hereinafter, referred to as a "considered target surface") on which each illumination module is positioned needs to meet two conditions. Firstly, at least three considered target surfaces need to have a location and an angle which allow light emitted from the lighting device 130 to be received. Secondly, area vectors of three considered target surfaces, on which respective illumination modules provided to measure illumination values required for analysis of the analysis unit 106 are positioned, need to have independency that the area vector of one of the three considered target surfaces is not synthesized from the area vectors of the other two considered target surfaces.

Figure 7A:
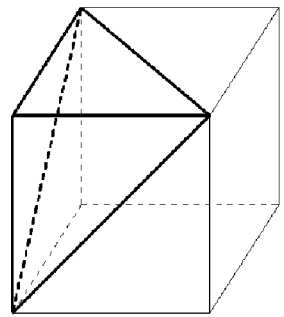
FIGS. 7A through 10 are diagrams for explaining an indoor location recognition method used by a recognition device, according to a third embodiment of the present invention.
Figure 7B:
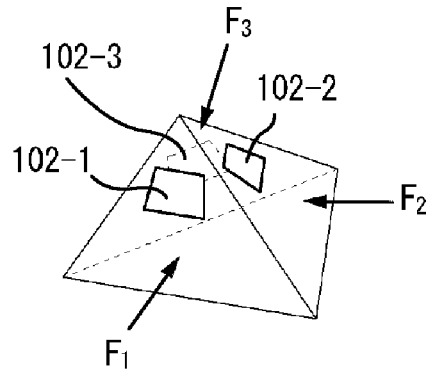

For example, as shown in the FIG. 7A, the 3D figure may be a right-angled tetrahedron cut away from a regular hexahedron along the straight lines connecting three apexes not adjacent to one another in the regular hexahedron. As shown in the FIG. 7B, illumination modules may be respectively positioned at three sides, i.e., considered target surfaces F1, F2, and F3, other than a base side. Here, if the two conditions are met, the 3D figure having three considered target surfaces on which illumination modules are respectively positioned may be a virtual 3D figure in which the considered target surfaces are not physically adjacent to one other and/or may have any other polyhedron shape.

Figure 7C:
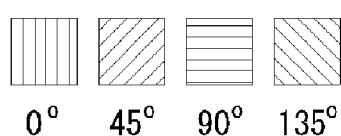
Figure 7D:
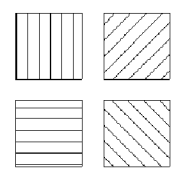

An illumination module positioned on each considered target surface may include a plurality of sub illumination modules. Each of the sub illumination modules may include a sub module polarizer and a sub illuminometer. For example, a plurality of sub module polarizers may be configured to have different module polarization axis angles of 0, 45, 90, and 135 degrees, respectively, as shown in FIGS. 7C and 7D. Each sub illuminometer may measure an illumination value of incident light polarized by a corresponding sub module polarizer and provide the illumination value to the analysis unit 106.

As examples of the layout of a plurality of sub module polarizers on each considered target surface, 1×4 and 2×2 are illustrated in the FIGS. 7C and 7D, but the number and the layout of polarizers included in each illumination module are not limited thereto.

Figure 7E:
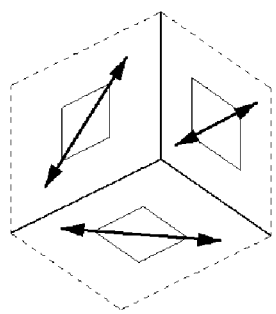

Although sub module polarizers are arranged in the same layout and structure on each considered target surface, a module polarization axis of an illumination module positioned on each considered target surface is different due to an angle of each of the considered target surfaces of a 3D figure (see FIG. 7E).

Hereinafter, a process in which the analysis unit 106 recognizes the lighting device 130, which has emitted light incident on each illumination module, using an illumination value measured in the illumination module will be described with reference to the FIG. 8.

FIG. 8A shows a conceptual shape, i.e., a polarization surface $F_p$, of light emitted from the polarized light source 132 of the lighting device 130. In other words, the light emitted from the lighting device 130 is linearly polarized along the light transmission axis of the polarized light source 132.

In FIG. 8A, $\vec{l}$ represents a direction vector in which light is emitted, i.e., a lighting direction vector, $\vec{v}$ represents a vibration direction of light polarized by the polarized light source 132, and $F_p$ represents a polarization surface, i.e., a plane including the direction vector $\vec{l}$ and the vibration direction $\vec{v}$.

Firstly, a process in which the analysis unit 106 calculates a lighting direction vector of light emitted from the lighting device 130 using an illumination module positioned on each considered target surface will be described.

It is assumed that the amount of light reaching each of three considered target surfaces (e.g., the sum of illumination values measured in a sub illumination module or an illumination value measured by a particular sub illumination module) is denoted by polarized light intensity (PLI)1, PLI2, or PLI3; coordinates of the lighting direction vector $\vec{l}$ are (Lx, Ly, Lz); normal vectors $\vec{Q}$ of the respective considered target surface are (Q1x, Q1y, Q1z), (Q2x, Q2y, Q2z), and (Q3x, Q3y, Q3z); and the intensity of light reaching the recognition device 100 is $I_0$.

Here, the lighting direction vector may be defined as a unit vector having a length of 1. The intensity of light "$I_0$" may be defined as a maximum value of the intensity of light measurable at a predetermined location of the recognition device 100. For example, the intensity of light, $I_0$, may be defined as the intensity of light incident on a considered target surface having a slope of 0 degrees.

At this time, when an angle between the lighting direction vector $\vec{l}$ and the normal vector $\vec{Q}$ of each considered target surface is $\theta$, the intensity of light reaching the considered target surface, i.e., PLI, has a relationship defined by $PLI=I_0 \times \cos\theta$ according to Lambert's cosine law saying that the amount of light is proportional to the cosine of an incidence angle.

In addition, the inner product of the two vectors $\vec{l}$ and $\vec{Q}$ is the same as the cosine of the angle between the two vectors $\vec{l}$ and $\vec{Q}$, that is, $a \cdot b = |a| \cdot |b| \cos\theta$. Therefore, when it is defined that the normal vector $\vec{Q}$ of each considered target surface and the lighting direction vector $\vec{l}$ are unit vectors having a length of 1, $\vec{Q} \cdot \vec{l} = \cos\theta$ is established.

Accordingly, when the above-described details are expressed in a determinant, they may be defined by Equation 4:

$$I_0 \times \begin{bmatrix} Q1x & Q1y & Q1z \\ Q2x & Q2y & Q2z \\ Q3x & Q3y & Q3z \end{bmatrix} \cdot \begin{bmatrix} Lx \\ Ly \\ Lz \end{bmatrix} = \begin{bmatrix} PLI1 \\ PLI2 \\ PLI3 \end{bmatrix}. \quad (4)$$

According to Equation 4, the lighting direction vector multiplied by the intensity of light, $I_0$, may be calculated from the inner product of a 3×3 inverse matrix corresponding to an aggregation of the normal vectors $\vec{Q}$ of the considered target surface and the PLI matrix on the right-hand side of Equation 4.

However, the lighting direction vector $\vec{l}$ is calculated based on a current pose of the recognition device 100 having an illumination module positioned on each considered target surface.

The analysis unit 106 may recognize sensing information, e.g., the degree of rotation or tilt of the recognition device 100 with respect to a predetermined reference direction, i.e., the due north direction or the direction of gravity, provided from the sensor unit 104 and may compensate the lighting direction vector $\vec{l}$ for the rotation or tilt, i.e., a displacement from the predetermined reference direction, thereby calculating a lighting direction vector in a predetermined default pose (i.e., in a reference coordinate system).

In other words, the analysis unit 106 may calculate a lighting direction vector in a state where the recognition device 100 is in the default pose using the sensing information from the sensor unit 104. Since information about a light source polarization axis angle of each lighting device 130 is stored in a storage based on the condition that the recognition device 100 is in the default pose (i.e., in the reference coordinate system), a lighting direction vector in the reference coordinate system needs to be calculated to identify the lighting device 130 using the stored information.

The analysis unit 106 may recognize a location relationship and/or an orientation relationship between the recognition device 100 and the lighting device 130 emitting light incident on the recognition device 100, based on a lighting direction vector calculated when the recognition device 100 is in the predetermined default pose.

A process in which the analysis unit 106 calculates a lighting direction vector and an acquired polarization surface which includes a light source polarization axis of the lighting device 130 will be described below.

As shown in FIG. 8B, a virtual polarization surface $F_p$ is formed by light emission of the polarized light source 132 in a 3D figure at which a plurality of illumination modules are positioned.

A virtual polarization surface formed by actual light emission of the polarized light source 132 may be referred to as an acquired polarization surface $F_p$, and an acquired polarization surface formed in a vertical shape when the recognition device 100 is located vertically below the lighting device 130 may be referred to as a reference polarization surface $F_p'$.

Polarization axis information of the lighting device 130 (or information about the reference polarization surface $F_p'$) may be stored in advance and managed in a storage (not shown) included in the recognition device 100.

For example, when the recognition device 100 is located vertically below the lighting device 130, the acquired polarization surface $F_p$ will be formed in a vertical shape, as shown in FIG. 8A. However, when the recognition device 100 is not located vertically below the lighting device 130, the acquired polarization surface $F_p$ will be formed in a slant shape, as shown in FIG. 8B.

In other words, the acquired polarization surface $F_p$ may vary with a path through which light emitted from the polarized light source 132 reaches the recognition device 100 but always includes polarization axis information of the lighting device 130 emitting light currently incident on the recognition device 100.

The acquired polarization surface $F_p$ forms virtual line segments on considered target surfaces on each of which an illumination module is positioned. In other words, a virtual line segment is formed on a considered target surface (assumed to be a first surface F1) and may be expressed as an intersection line vector $\vec{F_{p1}}$. Here, the analysis unit 106 may recognize the virtual line segment based on information about an illumination value measured by a corresponding illumination module.

A process for obtaining the intersection line vector $\vec{F_{p1}}$ will be briefly described below.

The intersection line vector $\vec{F_{p1}}$ refers to a vibration direction of a wavelength of polarized light incident on a considered target surface. In other words, the intersection line vector $\vec{F_{p1}}$ refers to a polarization axis observed on the considered target surface. Accordingly, when sub module polarizers having polarization axis angles of 0, 45, 90, and 135 degrees, respectively, are positioned on a considered target surface, as shown in FIG. 7C, and an angle between the intersection line vector $\vec{F_{p1}}$ and a first sub illumination module (e.g., a sub illumination module corresponding to a sub module polarizer having a polarization axis angle of 0 degrees) is $\theta$, illumination values In1, In2, In3, and In4 measured in respective sub illumination modules are calculated as $In1 = PLI \times \cos^2\theta$, $$\ln 2 = PLI \times \cos^2\left(\theta - \frac{\pi}{4}\right), \ln 3 = PLI \times \cos^2\left(\theta - \frac{\pi}{2}\right), \text{ and}$$

$$\ln 4 = PLI \times \cos^2\left(\theta - \frac{3\pi}{4}\right)$$

according to Malus's law.

When these equations are combined, the angle θ between the intersection line vector $\vec{F}_{p1}$ and the first sub illumination module may be calculated, according to the principle of trigonometric function, using Equation 5:

$$\theta = \tan^{-1}\left(\frac{\ln 2 - \ln 4}{\ln 1 - \ln 3}\right) \times \frac{1}{2}. \quad (5)$$

At this time, a module polarization axis direction of a first sub module polarizer corresponding to the first sub illumination module is fixed to a corresponding considered target surface, and therefore, the module polarization axis direction may be defined as a 3D vector in a coordinate system based on the current pose of the recognition device 100. The intersection line vector $\vec{F}_{p1}$ of the considered target surface may be calculated by rotating the 3D vector by the angle θ calculated using Equation 5.

The analysis unit 106 may calculate the intersection line vector $\vec{F}_{p1}$ of each of considered target surfaces by performing the above-described process on each considered target surface.

Accordingly, intersection line vectors $\vec{F}_{p1}$ and an acquired polarization surface $F_p$ formed of the intersection line vectors $\vec{F}_{p1}$ may be analyzed with respect to three considered target surfaces on which illumination modules are respectively positioned in a 3D figure. An acquired normal vector perpendicular to the acquired polarization surface $F_p$ may be calculated from the outer product of two vectors among the intersection line vectors $\vec{F}_{p1}$.

This is because two or three intersection line vectors, i.e., tangents of a surface, exist on one acquired polarization surface $F_p$. When a 3D figure has a shape other than a right-angled tetrahedron, the number of intersection line vectors may be different.

The analysis unit 106 may recognize sensing information, e.g., the degree of rotation or tilt of the recognition device 100 with respect to a predetermined reference direction, i.e., the due north direction or the direction of gravity, provided from the sensor unit 104 and may compensate the acquired polarization surface $F_p$ for the rotation or tilt, i.e., a displacement from the predetermined reference direction, thereby calculating an acquired polarization surface in a predetermined default pose (i.e., in a reference coordinate system).

As described above, information about an acquired polarization surface includes light polarization axis information set in each lighting device 130, and the analysis unit 106 may recognize light emitted from which lighting device 130 is currently incident on the recognition device 100, based on the light polarization axis information of each lighting device 130 stored in a storage in advance.

At this time, the light polarization axis information of each lighting device 130 stored in the storage is defined in the reference coordinate system corresponding to a state where the recognition device 100 is in the default pose, and therefore, the analysis unit 106 may obtain an acquired polarization surface in the reference coordinate system, by rotating an acquired polarization surface calculated using intersection line vectors based on the sensing information received from the sensor unit 104, and may specify the lighting device 130 currently radiating light at the recognition device 100 using light polarization axis information obtained from the acquired polarization surface in the reference coordinate system.

As described above, the analysis unit 106 may recognize the pose of the recognition device 100 (or a moving object) based on the sensing information received from the sensor unit 104. In addition, when information about installation location and height of each lighting device is already known to the analysis unit 106, the analysis unit 106 may recognize a relative location of the recognition device 100 with respect to the installation location of a lighting device radiating light at the recognition device 100 based on a lighting direction vector.

Besides, the analysis unit 106 may recognize the pose and location of the recognition device 100 using the relation between an acquired polarization surface and a reference polarization surface.

Figure 8C:
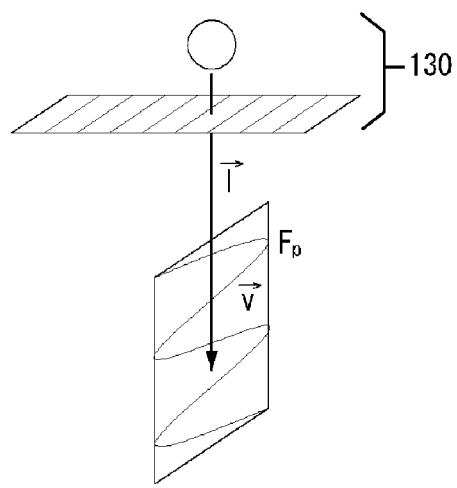
Figure 8C:
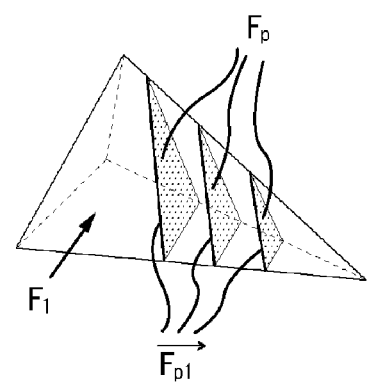
Figure 8C:
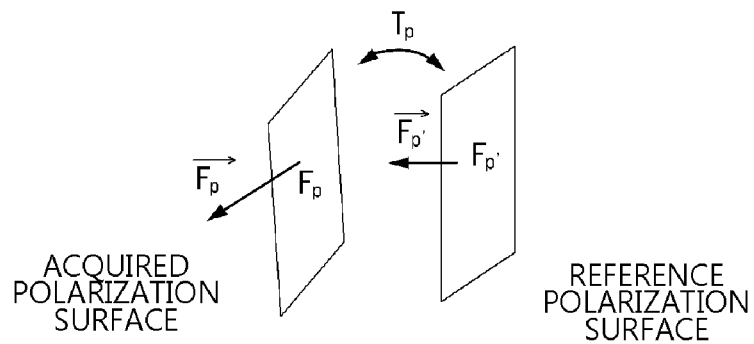

Since information on the reference polarization surface $F_p'$ and a reference normal vector $\vec{F}_{p'}$ perpendicular to the reference polarization surface $F_p'$ are stored in advance and managed in the storage, the analysis unit 106 may calculate a tilt angle $T_p$ between the acquired normal vector $\vec{F}_p$ and the reference normal vector $\vec{F}_{p'}$, which have been calculated in the above-described process, in the 3D space (see FIG. 8C). When the acquired polarization surface $F_p$ is rotated by the tilt angle $T_p$ in the 3D space, the acquired polarization surface $F_p$ coincides with the reference polarization surface $F_p'$.

When the acquired polarization surface $F_p$ completely become to coincide with the reference polarization surface $F_p'$, i.e., when a preliminary operation for analyzing the pose of the recognition device 100 assuming that the recognition device 100 is located vertically below a particular lighting device 130 is completed, a pose candidate group for generating pose information of the recognition device 100 or a moving object may be determined.

Figure 9:
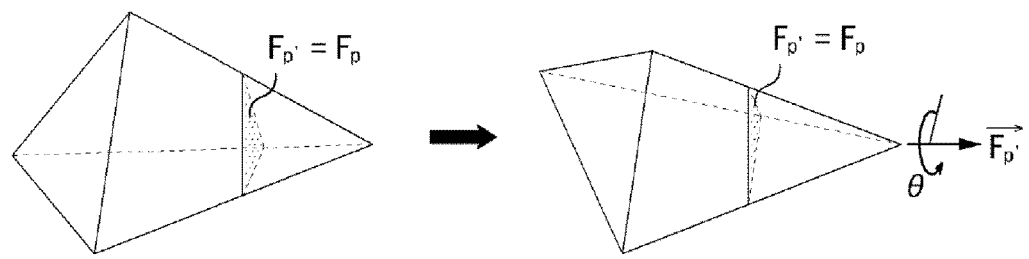
Figure 10:
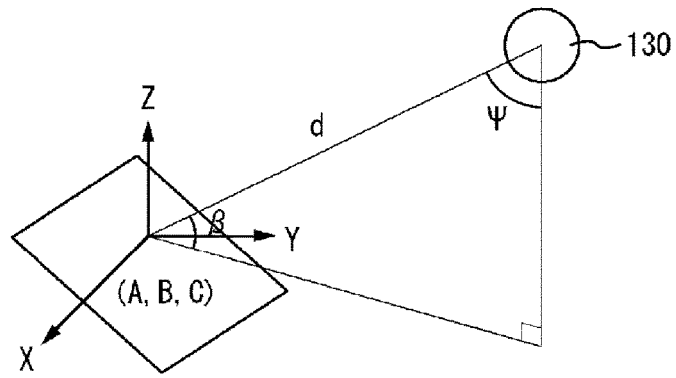

As shown in FIG. 9, when the recognition device 100 (i.e., a 3D figure determined by illumination modules attached to a moving object) rotates around the reference normal vector perpendicular to the reference polarization surface $F_p'$ while the reference polarization surface $F_p'$, with which the acquired polarization surface $F_p$ becomes to coincide through 3D rotation, is recognized as a virtual cut surface cutting the 3D figure, the pose of the recognition device 100 is changed although the tilt angle of the intersection line vector on three considered target surfaces is not changed. Therefore, information on poses which can be taken by the recognition device 100 in a state where the tilt angle of the intersection line vector on the three surfaces is not changed may be specified as a pose candidate group.

Accordingly, pose information of the recognition device 100 may be finally determined only after determining at which angle the recognition device 100 has rotated with respect to the pose candidate group.

Hereinafter, a process in which the analysis unit 106 finally determines the pose information of the recognition device 100 with respect to the pose candidate group will be briefly described below.

The analysis unit 106 may recognize the amount (illumination value) of light, which reaches considered target surfaces, using illumination value information provided from the illumination unit 102 including a plurality of illumination modules. The analysis unit 106 may also calculate a ratio of the illumination values of the respective considered target surfaces.

Accordingly, the analysis unit 106 may acquire the pose information of the recognition device 100 using a transformation equation for a rotation by a rotation angle θ around the reference normal vector $\vec{F_{p'}}$, i.e., Equation 6:

$$\frac{\begin{bmatrix} A_1\cos\theta - B_1\sin\theta \\ B_1\cos\theta + A_1\sin\theta \\ C_1 \end{bmatrix} \cdot \vec{l}}{\begin{bmatrix} A_2\cos\theta - B_2\sin\theta \\ B_2\cos\theta + A_2\sin\theta \\ C_2 \end{bmatrix} \cdot \vec{l}} = \frac{PLI1}{PLI2}, \quad (6)$$

where $\vec{l}$ is a direction vector of incident light (i.e., a lighting direction vector), PLI1 is an illumination value of a first considered target surface, $(A_1, B_1, C_1)$ is an area vector of the first considered target surface after a rotation by the tilt angle $T_p$, PLI2 is an illumination value of a second considered target surface, and $(A_2, B_2, C_2)$ is an area vector of the second considered target surface after the rotation by the tilt angle $T_p$. The analysis unit 106 may calculate the illumination value of each considered target surface by performing a predetermined operation, e.g., arithmetic summation, weighted summation, or multiplication, on output values of respective illuminometers included in the illumination unit 102.

Since PLI1, PLI2, $\vec{l}$, $(A_1, B_1, C_1)$, and $(A_2, B_2, C_2)$ are known values and only the rotation angle θ is an unknown value, the analysis unit 106 may calculate the rotation angle θ using Equation 6 and may store the calculated rotation angle θ in the storage as the pose information of the recognition device 100.

The analysis unit 106 may calculate the location information using the illumination value information provided from the illumination unit 102. A process of calculating the location information will be briefly described with reference to FIG. 10 below.

When three considered target surfaces are selected in the pose information analysis process described above, the area vector $(A_i, B_i, C_i)$ of each considered target surface may be given by Equation 7:

$$A_ix + B_iy + C_iz = 1 \quad (7)$$

where "i" is a factor for specifying each considered target surface and may be 1, 2, or 3 when the number of considered target surfaces is 3.

When it is assumed that the location of the polarized light source 132 is (0, 0, 0) and the location of the recognition device 100 is (x, y, z), the location of the recognition device 100 may be determined using Equations 8 through 11 below.

At this time, a relationship between the amount of light reaching the recognition device 100 and the location of a light source of the light is constituted by three elements: a distance (i.e., f(d), see Equation 8 below) between the polarized light source 132 and the recognition device 100; an angle (i.e., g(β), see Equation 9 below) at which each of the considered target surfaces tilts with respect to the polarized light source 132; and the fact that light is uniformly emitted in a spherical shape from the polarized light source 132 (see Equation 10 below):

$$f(d) = \frac{k}{d^2} = \frac{k}{\left(\sqrt{x^2 + y^2 + z^2}\right)^2} = \frac{k}{x^2 + y^2 + z^2}, \quad (8)$$

where "k" is a predetermined constant, $$g(\beta) = \cos(\beta) = \frac{(A, B, C) \cdot (x, y, z)}{\sqrt{A^2 + B^2 + C^2}\sqrt{x^2 + y^2 + z^2}}, \text{ and} \quad (9)$$

$$h(\psi) = \cos(\psi) = \frac{z}{\sqrt{x^2 + y^2 + z^2}}. \quad (10)$$

Here, Equation 10 is used to assume that the polarized light source 132 is continuously positioned on a ceiling and uniformly emits light in a hemispherical shape.

An illumination value, i.e., PLI, of an illumination module may be calculated by multiplication of Equations 8 through 10 as shown in Equation 11:

$$PLI = f(d)g(\beta)h(\psi) = \quad (11)$$

$$\frac{kz}{\sqrt{A^2 + B^2 + C^2}(x^2 + y^2 + z^2)^2}(A, B, C) \cdot (x, y, z) =$$

$$\frac{kz}{\sqrt{A^2 + B^2 + C^2}(x^2 + y^2 + z^2)^2}(Ax + By + Cz).$$

Equation 11 is applied to each of the considered target surfaces. Here, PLI, "k", and $(A_i, B_i, C_i)$ are known values and "x", "y", and "z" for determining the location of the recognition device 100 (i.e., a moving object) are unknown values.

The analysis unit 106 may calculate the unknown values, "x", "y", and "z", by calculating a simultaneous equation using three equations of the respective considered target surfaces, the three equations each being written based on Equation 11. As a result, the analysis unit 106 may calculate the location information of the recognition device 100 and store the location information in the storage.

As described above, according to some embodiments of the present invention, the recognition device 100 may receive light emitted from the polarized light source 132 and may calculate information on a moving object, i.e., pose and location information of the moving object.

The above-described indoor location recognition method may be performed by a program or the like, which has been embedded or installed in a digital processing device, in an automated procedure according to a time series order. Codes and code segments constituting the program can be easily construed by programmers skilled in the art to which the present invention pertains. The program is stored in a computer readable medium which can be read by the digital processing device. When the program is read and executed by the digital processing device, the method is implemented. Examples of the computer readable medium include magnetic storage media and optical storage media.

While the present invention has been particularly shown and described with reference to embodiments thereof, it will be understood that various changes in form and details may be made therein without departing from the spirit and scope of the following claims.

The invention claimed is:

1. An indoor location recognition system comprising a recognition device, the recognition device comprising:
    an illumination unit comprising a plurality of illumination modules respectively having different predetermined light receiving characteristics, each of the illumination modules receiving polarized light emitted from at least one lighting device among a plurality of lighting devices according to one of the predetermined light receiving characteristics and measuring an illumination value; and an analysis unit configured to calculate a light source polarization axis angle of the at least one lighting device using a predetermined linear polarization rule and the illumination value measured by each illumination module, the at least one lighting device emitting light received by the illumination unit, wherein the plurality of lighting devices are installed indoors and are configured to have different light source polarization axis angles, respectively, according to which polarized light is emitted, and the lighting devices comprise overlapping lighting devices configured to have unique lighting time periods, respectively.

2. The indoor location recognition system of claim 1, wherein the light source polarization axis angle is mapped to location information of the recognition device using predetermined matching map information.

3. The indoor location recognition system of claim 1, wherein the illumination modules comprise:

an unpolarized illumination module configured to receive linearly polarized light emitted from the at least one lighting device and calculate an unpolarized illumination value; and a polarized illumination module comprising a module polarizer having a predetermined module polarization axis angle, the polarized illumination module being configured to receive polarized light emitted from the at least one lighting device through the module polarizer and calculate a polarized illumination value, and the analysis unit calculates an angle difference between the light source polarization axis angle and the module polarization axis angle using the linear polarization rule predetermined about a relation between the unpolarized illumination value and the polarized illumination value and calculates the light source polarization axis angle using the angle difference.

4. The indoor location recognition system of claim 3, wherein the recognition device further comprises a sensor unit configured to generate sensing information corresponding to a rotation angle of the recognition device with respect to a predetermined reference direction, and the analysis unit applies the rotation angle to the angle difference and calculates the light source polarization axis angle with respect to the predetermined reference direction.

5. The indoor location recognition system of claim 1, wherein the illumination modules comprise:

a first polarized illumination module comprising a first module polarizer having a first predetermined module polarization axis angle, the first polarized illumination module being configured to receive polarized light emitted from the at least one lighting device through the first module polarizer and calculate a first polarized illumination value; and a second polarized illumination module comprising a second module polarizer having a second predetermined module polarization axis angle, the second polarized illumination module being configured to receive polarized light emitted from the at least one lighting device through the second module polarizer and calculate a second polarized illumination value, and the analysis unit calculates an angle difference between the light source polarization axis angle and the first module polarization axis angle using the linear polarization rule predetermined about a relation between the first polarized illumination value and the second polarized illumination value and calculates the light source polarization axis angle using the angle difference.

6. The indoor location recognition system of claim 5, wherein the recognition device further comprises a sensor unit configured to generate sensing information corresponding to a rotation angle of the recognition device with respect to a predetermined reference direction, and the analysis unit applies the rotation angle to the angle difference and calculates the light source polarization axis angle with respect to the predetermined reference direction.

7. The indoor location recognition system of claim 1, wherein each of the illumination modules comprises a plurality of sub illumination modules and is positioned on a corresponding one of a plurality of surfaces of a three-dimensional (3D) figure, each of the sub illumination modules comprises a sub module polarizer and an illuminometer, the sub module polarizer having a predetermined sub module polarization axis angle, the sub illumination modules are configured to have different sub module polarization axis angles, respectively, and three considered target surfaces selected from among the plurality of surfaces of the 3D figure are at positions which the polarized light emitted from the at least one lighting device reaches, and the three considered target surfaces meet a condition that an area vector of one of the three considered target surfaces is not synthesized from area vectors of the other two considered target surfaces among the three considered target surfaces.

8. The indoor location recognition system of claim 7, wherein the 3D figure has a concrete shape or is a virtual 3D figure formed when a considered target surface, on which each illumination module is positioned, is virtually extended.

9. The indoor location recognition system of claim 7, wherein the analysis unit calculates a lighting direction vector using the predetermined linear polarization rule, according to which the lighting direction vector corresponding to the at least one lighting device emitting the light incident on each illumination module positioned on a corresponding considered target surface among the three considered target surfaces is calculated using the illumination value measured in each illumination module and a normal vector of the corresponding considered target surface.

10. The indoor location recognition system of claim 9, wherein the recognition device further comprises a sensor unit configured to generate sensing information corresponding to a rotation angle of the recognition device with respect to a predetermined reference direction, and the analysis unit converts the calculated lighting direction vector into a lighting direction vector in a predetermined reference coordinate system by applying the rotation angle to the calculated lighting direction vector.

11. The indoor location recognition system of claim 7, wherein the analysis unit calculates an intersection line vector of each of the three considered target surfaces using illumination values respectively measured in the sub illumination modules positioned on each considered target surface, calculates an acquired polarization surface of the 3D figure using the intersection line vector of each considered target surface, and acquires the light source polarization axis angle from the calculated acquired polarization surface.

12. The indoor location recognition system of claim 11, wherein the recognition device further comprises a sensor unit configured to generate sensing information corresponding to a rotation angle of the recognition device with respect to a predetermined reference direction, and
the analysis unit converts the calculated acquired polarization surface into an acquired polarization surface in a predetermined reference coordinate system by applying the rotation angle to the calculated acquired polarization surface, and acquires the light source polarization axis angle based on the acquired polarization surface in the predetermined reference coordinate system.

13. An indoor location recognition method performed in a recognition device, the indoor location recognition method comprising:
receiving illumination values respectively measured in a plurality of illumination modules according to predetermined light receiving characteristics, the plurality of illumination modules respectively having the predetermined light receiving characteristics which are different from one another; and
calculating a light source polarization axis angle of at least one lighting device among a plurality of lighting devices using a predetermined linear polarization rule and the illumination values measured in the respective illumination modules, the at least one lighting device emitting light received by an illumination unit comprising the illumination modules, wherein the plurality of lighting devices are installed indoors and are configured to have different light source polarization axis angles, respectively, according to which polarized light is emitted, and the lighting devices comprise overlapping lighting devices configured to have unique lighting time periods, respectively.

14. The indoor location recognition method of claim 13, wherein the light source polarization axis angle is mapped to location information of the recognition device using predetermined matching map information.

15. A computer readable recording medium having recorded thereon a program for executing the method of claim 13.

16. A non-transitory computer readable recording medium having recorded thereon a program for executing the method of claim 14.

* * * * *